Jan. 1, 1957 L. J. KOCH 2,776,167
APPARATUS FOR PRODUCING RAIN CLOUD MOISTURE
Filed Oct. 12, 1954 7 Sheets-Sheet 1

Lynn J. Koch
INVENTOR

BY C. A. Snow & Co.
ATTORNEYS.

Jan. 1, 1957   L. J. KOCH   2,776,167
APPARATUS FOR PRODUCING RAIN CLOUD MOISTURE
Filed Oct. 12, 1954   7 Sheets-Sheet 2

Lynn J. Koch  INVENTOR
BY C. A. Snow & Co.
ATTORNEYS

Jan. 1, 1957 L. J. KOCH 2,776,167
APPARATUS FOR PRODUCING RAIN CLOUD MOISTURE
Filed Oct. 12, 1954 7 Sheets-Sheet 3

Lynn J. Koch
INVENTOR

BY C. A. Snow & Co.
ATTORNEYS.

Jan. 1, 1957 L. J. KOCH 2,776,167
APPARATUS FOR PRODUCING RAIN CLOUD MOISTURE
Filed Oct. 12, 1954 7 Sheets-Sheet 4

Fig. 7.

Lynn J. Koch
INVENTOR

BY Chwow+leo.
ATTORNEYS.

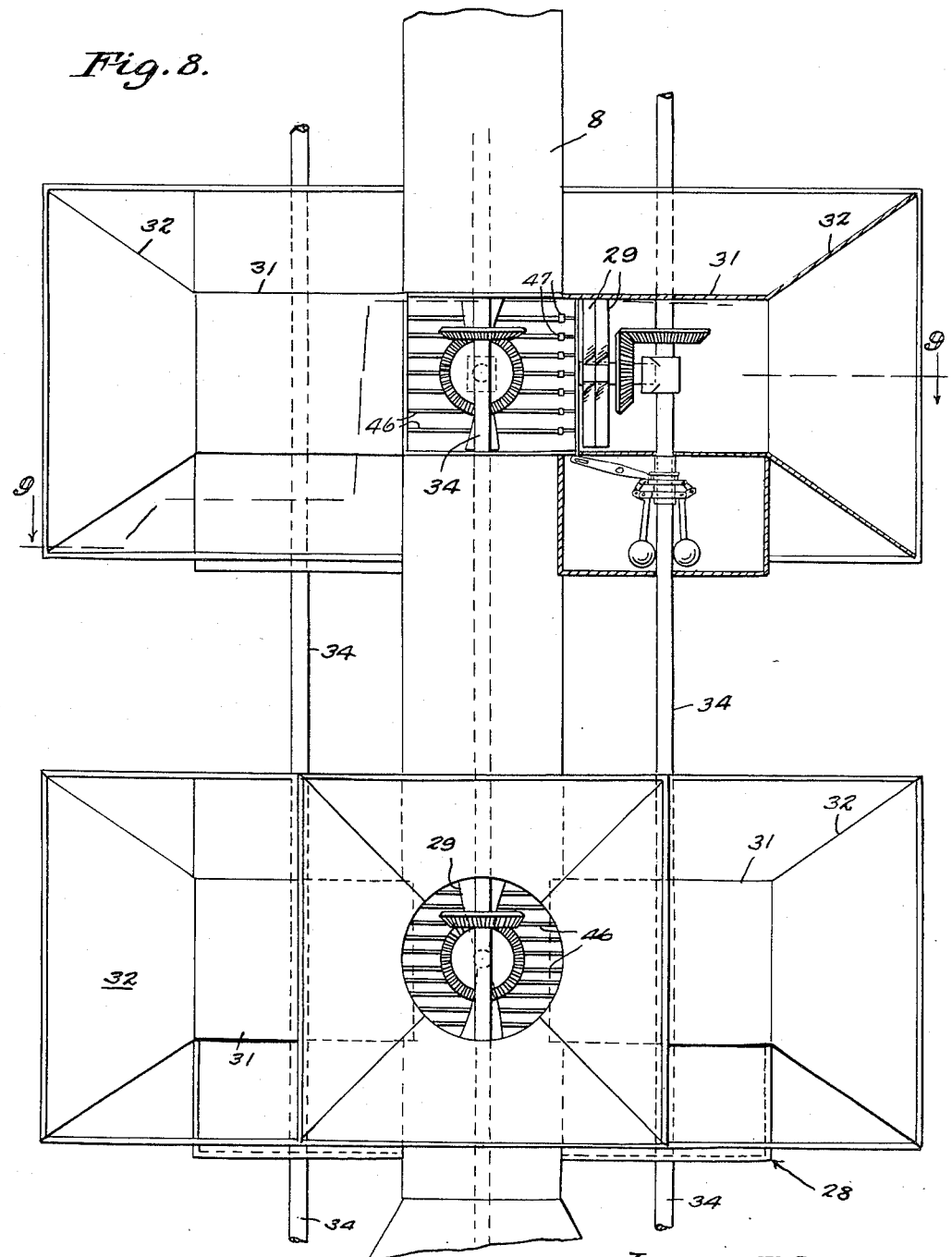

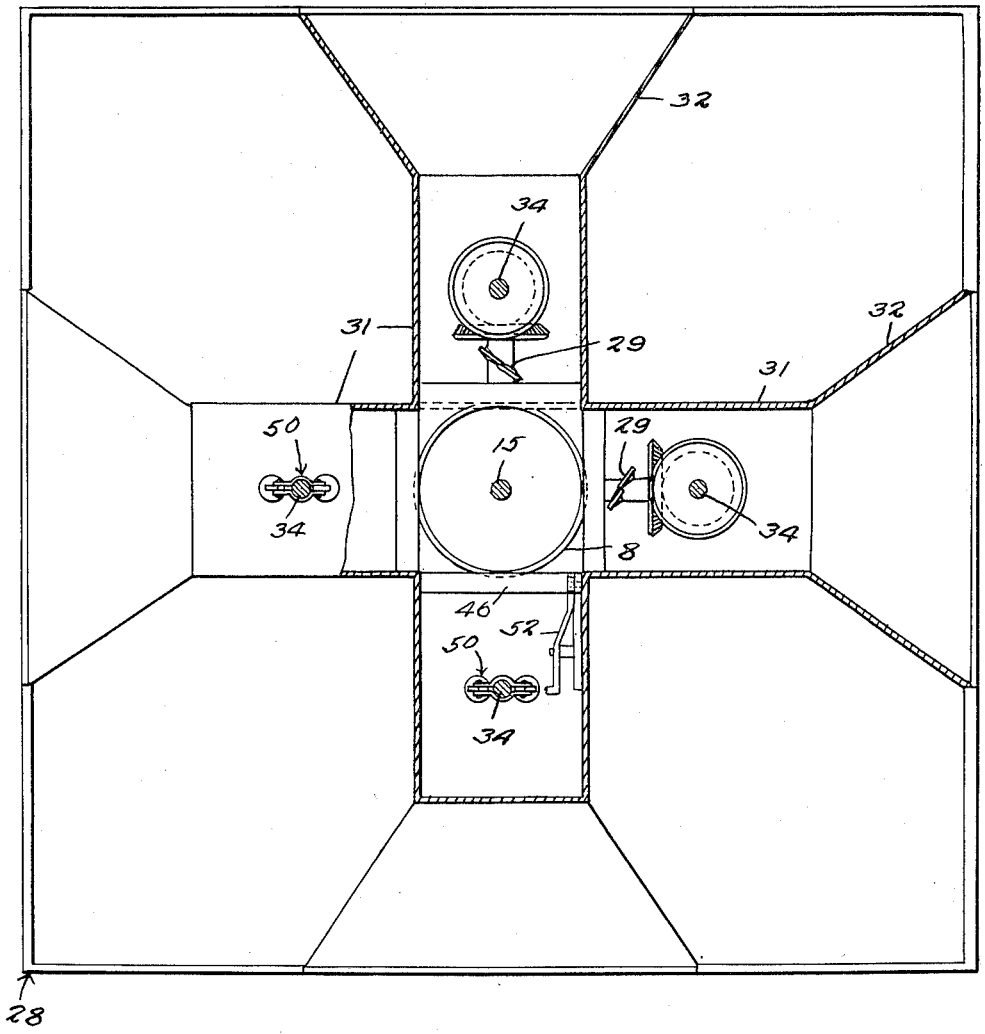
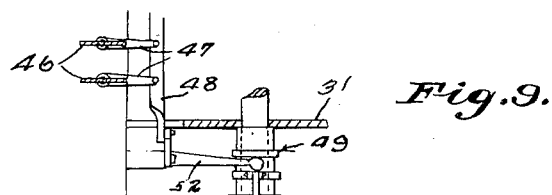
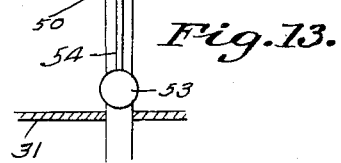

Jan. 1, 1957 L. J. KOCH 2,776,167
APPARATUS FOR PRODUCING RAIN CLOUD MOISTURE
Filed Oct. 12, 1954 7 Sheets-Sheet 7
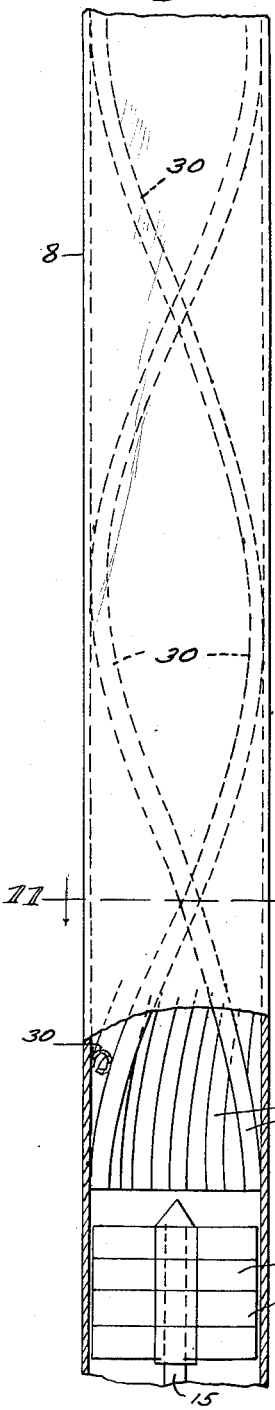
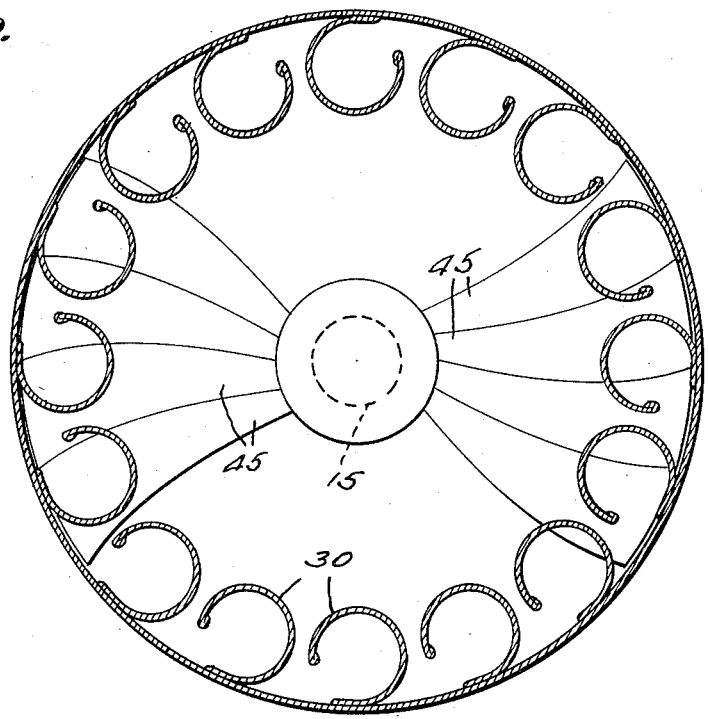
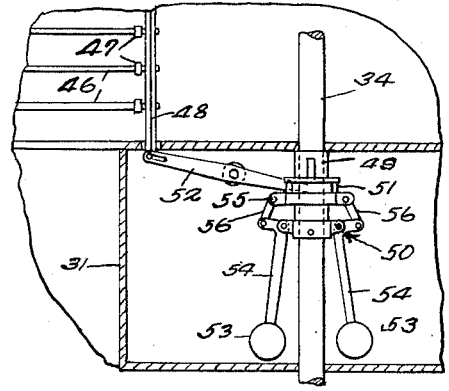
Lynn J. Koch
INVENTOR
BY C.A.Snow+Co.
ATTORNEYS.

United States Patent Office 2,776,167
Patented Jan. 1, 1957

2,776,167

APPARATUS FOR PRODUCING RAIN CLOUD MOISTURE

Lynn J. Koch, Los Angeles, Calif.

Application October 12, 1954, Serial No. 461,877

7 Claims. (Cl. 299—29)

This invention relates to an apparatus for lifting water from a body of water upon which the apparatus floats, the lifting apparatus being so constructed and arranged that water will be lifted to great heights and transformed into fine spray during the lifting operation, the spray being then liberated into the atmosphere.

An important object of the invention is to provide an apparatus of this character which will be propelled over the surface of the body of water, means being provided for directing the water into the lower end of a stack, circular lifts being provided in the stack and lifting propellers for directing the water upwardly through the stack or tower, discharging the water in a fine spray at the desired height for the effective operation of the apparatus.

Still another object of the invention is to provide a tower or stack and means for directing water lifted by the apparatus laterally from the stack or tower.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 7 is a transverse sectional view taken on line 7—7 of Fig. 4.

Fig. 8 is an enlarged elevational view illustrating the propeller operating gearing.

Fig. 9 is a sectional view taken on line 9—9 of Fig. 8.

Fig. 10 is a fragmental elevational view of the stack or tower illustrating the spirally formed baffles extending longitudinally thereof for causing the water to take a spiral course through the stack or tower.

Fig. 11 is a sectional view taken on line 11—11 of Fig. 10.

Fig. 12 is an enlarged fragmental vertical view through one of the propeller housings.

Fig. 13 is a detail view of the governor controlling means for automatically adjusting the pivoted shutters.

Figures 1, 2:
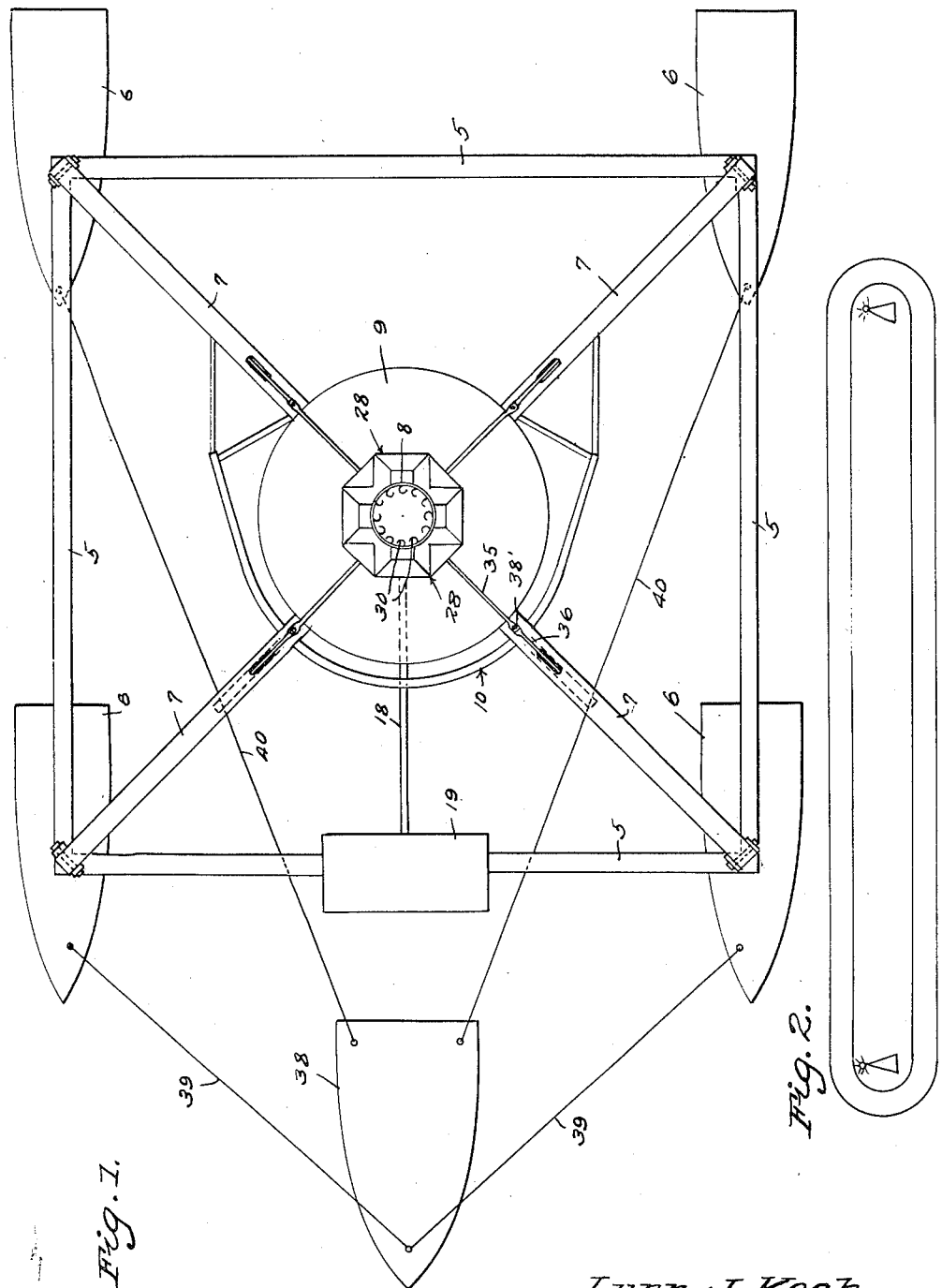
Figure 1 is a plan view of an apparatus constructed in accordance with the invention.
Fig. 2 is a diagram illustrating the sailing course of the apparatus while in operation.
Figure 3:
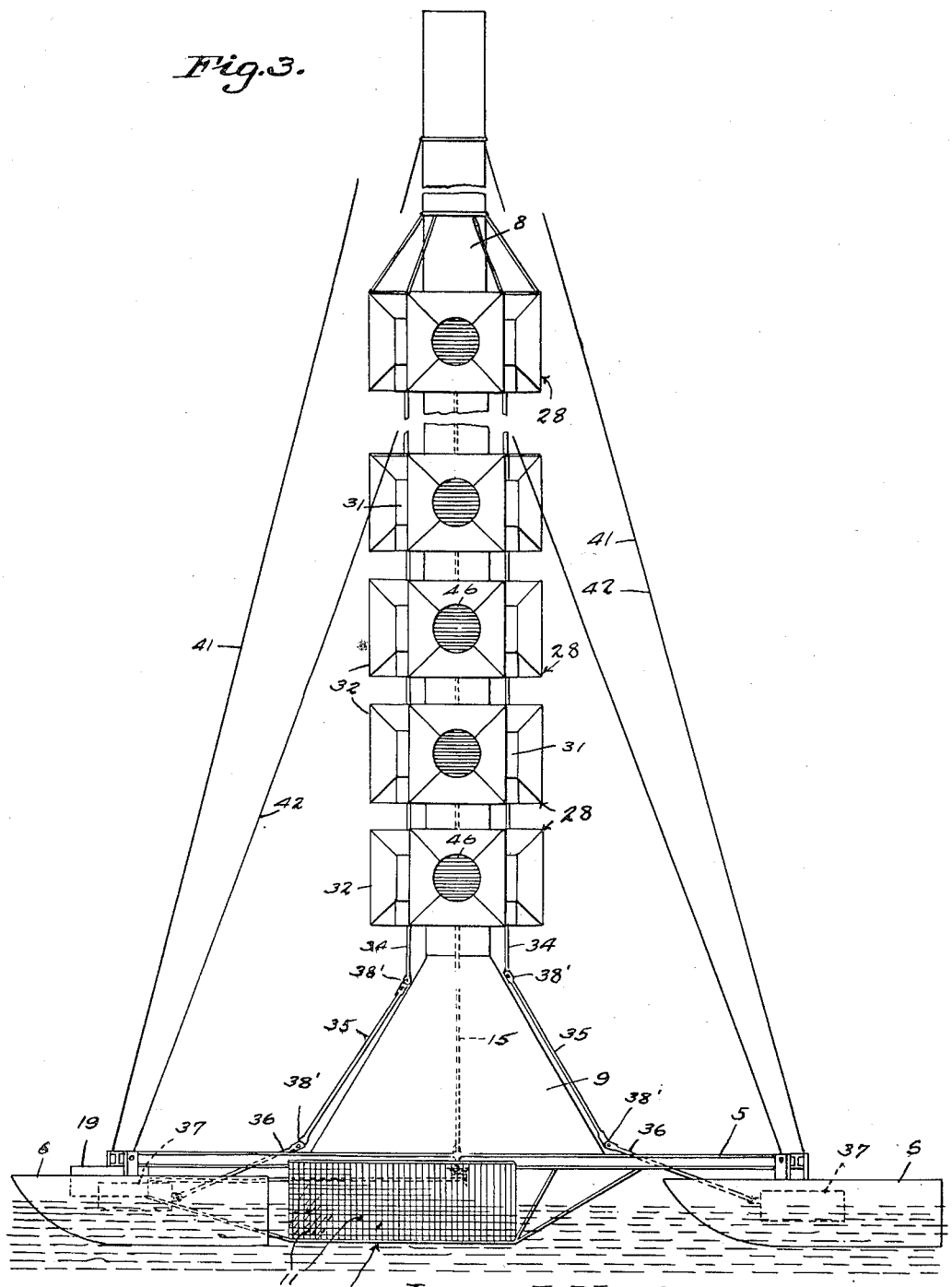
Fig. 3 is a fragmental side elevational view of the apparatus.

Referring to the drawings in detail, the apparatus comprises a rectangular frame embodying rails 5, connected at their ends, as better shown by Fig. 1 of the drawings.

Arranged at the corners of the rectangular frame, are the floats 6 which are of sizes to float the apparatus on a body of water.

Secured at the corners of the frame and extending inwardly therefrom, are the bars 7, which bars provide a support for the stack or tower 8 which has its lower end flared at 9, the flared end resting directly on the bars 7. These bars 7 so cross each other at the central point of the rectangular frame, to securely brace the bars 7 to support excessive weight.

Disposed under the rectangular frame, is a frame 10 which is curved in the arc of a circle. This frame 10 provides a support for the deflectors 11, which are in the form of scoops that are inclined between bars 12 of the frame, the bars 12 having their forward edges tapered at 13 to cut through the water to be picked up by the deflectors or scoops 11. Since these deflectors or scoops 11 are disposed directly under the flared portion 9 of the stack or tower, it is obvious that the water scooped up by said deflectors or scoops 11, will be directed upwardly into the flared portion 9 of the stack or tower.

Figure 4:
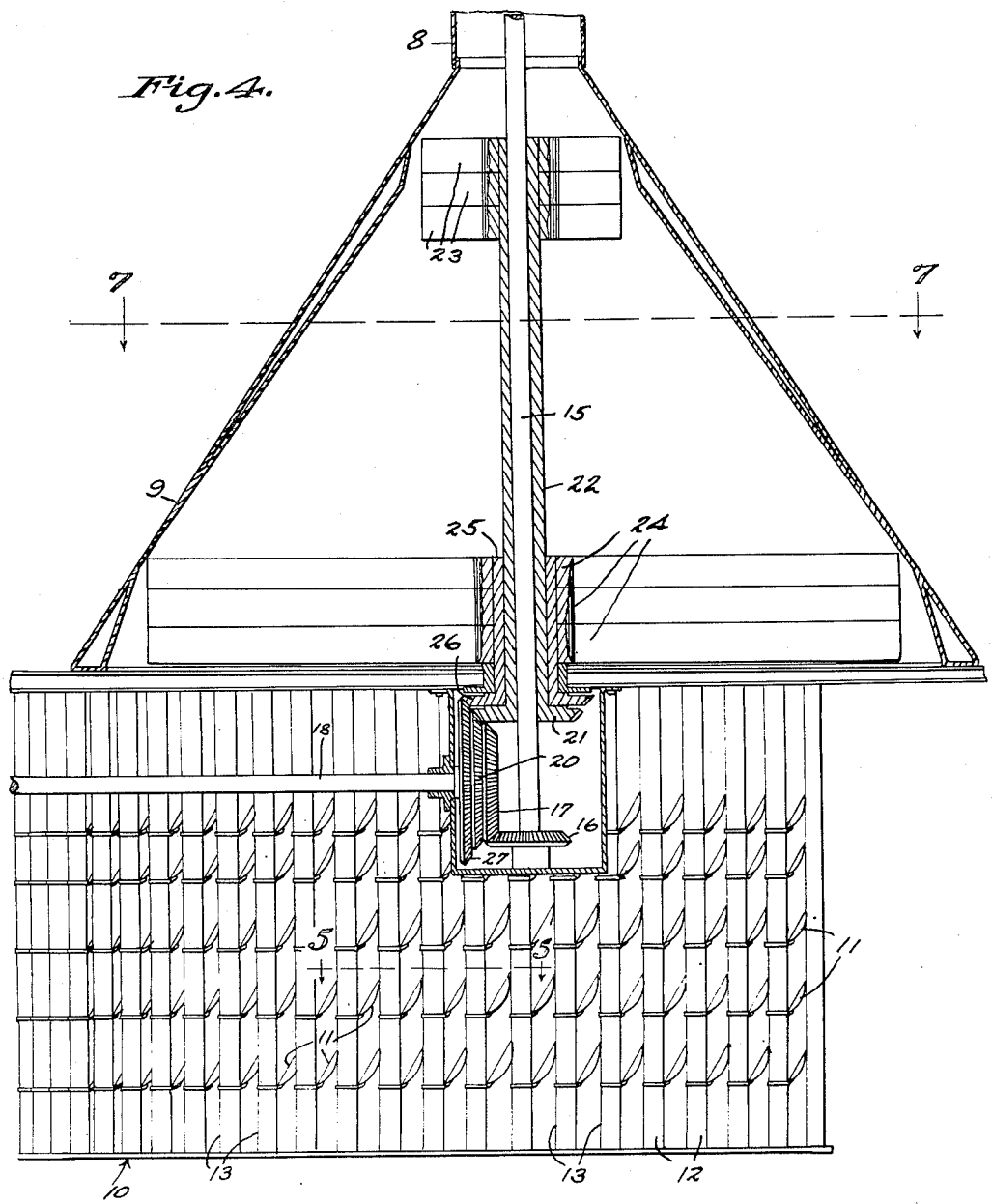
Fig. 4 is a vertical sectional view through the lower end of the stack or tower.
Figure 5:
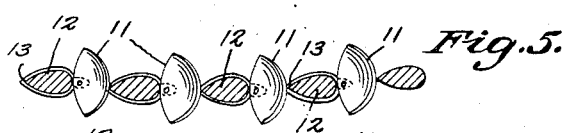
Fig. 5 is a fragmental sectional view taken on line 5—5 of Fig. 4.
Figure 6:
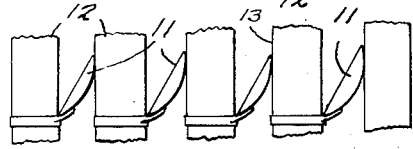
Fig. 6 is a fragmental side elevational view illustrating the frame in which the curved deflectors used in deflecting water into said stack, are supported.

As shown by Fig. 4 of the drawings these deflectors or scoops are arranged in superposed relation with respect to each other so that the water scooped up will be directed upwardly with great force.

Directly under the flared portion of the stack or tower, is a gear box 14 into which the shaft 15 extends, there being provided a gear 16 secured to the lower end of the shaft 15, which gear meshes with a gear 17 secured on the inner end of the power shaft 18.

This power shaft 18 extends into the power plant 19 that is suspended from the forward rail 5 of the frame. Also secured to the power shaft 18, is a gear 20, which gear 20 meshes with a gear 21 secured to the lower end of the tubular shaft 22 that extends to the upper end of the flared portion 9, where it supports the propeller blade 23 for lifting the water into the stack for travel through the stack. A propeller 24 is secured to the upper end of the tubular shaft 25, the propeller 24 being substantially large as compared with the propeller blades 23, so that water directed into the flared portion 9 will be forced upwardly and picked up by the propeller blades 23. The gear 26 is secured to the lower end of the tubular shaft 25 for mesh with the gear 27 secured to the power shaft 18.

A plurality of propeller housings or boosters 28 are arranged along the stack or tower 8 and in each propeller housing is mounted a water lift in the form of a propeller 29. The stack or tower is provided with a plurality of spirally formed deflectors 30 secured to the inner surface of the stack, or by rifling the stack or tower, so that water directed into the stack or tower will be caused to move spirally on its passage through the stack or tower.

Mounted on the upper extremity of the shaft 15 are fan blades 45 which act to further boost the water which has now been transformed into a fine spray, upwardly through the pipe section 8 in which the deflectors 30 are disposed.

As better shown by Fig. 9 of the drawings, each of these propeller housings is formed with inlet pipes 31 disposed at right angles with respect to each other, the inlet pipes 31 being in communication with the stack or tower 8 so that air and moisture may be drawn into the inlet pipes. The outer ends of said inlet pipes 31 are flared at 32 to allow the air and fog to be drawn into the stack.

In each inlet pipe 31 is a propeller 29, and these propellers 29 are operated by the shafts 34, 35 and 36.

Disposed within each inlet pipe 31, and arranged between the propellers 29 and the tower 8, are pivoted shutters 46 that have cranks 47 formed on one of their respective ends, to which cranks actuating rods 48 are secured for moving the shutters 46 to vary the degree of opening of the shutters according to the speed of rotation of the shaft 54 associated therewith.

The reference character 49 indicates a vertically movable sleeve of the governor 50, which sleeve is provided with a groove in which the forked end 51 of the lever 52 operates, the opposite end of the lever 52 being connected with the actuating rod 48 associated therewith. The governor 50 is of the conventional type and embodies swinging weights 53 mounted at the outer ends of the arms 54, the arms 54 being connected with the arms 55 of the governor sleeve, through the links 56. Thus it will be seen that as the shafts 34 are rotated, the shutters 46 will be opened or closed according to the speed of rotation of the shafts 34, to the end that as the shafts 34 speed up, the shutters will be opened to a greater degree to allow a greater air blast to enter the stack or tower 8 to boost the water and transform the water entering the stack or tower into a fine spray.

The shafts 36 extend to the engines 37 that are mounted in the floats 6, so that power may be directed to the propellers 29. These engines 37 are supported by the floats 6.

Universal couplings 38' are provided connecting the adjacent ends of shafts 35 and 36.

The reference character 38 indicates the tow boat or tug from which the two ropes 39 extend, the ropes 39 being connected with the forward floats 6. Tow ropes of cable 40 are connected with the rear of the tow boat 38 and connected with the bow ends of the floats 6, as shown by Fig. 1 of the drawings.

In order that the stack or tower will be held in a true vertical position, guide wires 41 and 42 are provided and extend to points adjacent to the upper end of the stack, the lower ends of said guide wires being secured to the frame to which the floats 6 are connected.

In operation the apparatus is positioned on the surface of a body of water, whereupon the apparatus is towed along the surface of the water with the result that the deflectors or scoops will scoop up the water and direct the water upwardly into the flared end 9 of the stack or tower. The water and air is now picked up by the propeller blades 23 which are rapidly rotating, to the end that the water is converted into a fine spray and directed upwardly through the stack or tower 8. The propellers 29 which are mounted in the inlet pipes 31, draw in air at all four sides of the stack or tower, the air or moisture drawn in through the pipes 31 tending to further convert the fluid and fog passing upwardly through the stack or tower, into a fine spray, the fine spray being liberated at the top of the stack or tower.

Having thus described the invention, what is claimed is:

1. A device for elevating water, comprising a float supported frame, a tower rising from said frame, means for moving said frame through a body of water, scoops supported by said frame adapted to direct water upwardly into said tower, and means for creating a blast of air through the base of said tower, transforming the water into mist and discharging the mist from the top of the tower to the atmosphere.

2. A device for elevating water, comprising a float supported frame adapted to be moved through a body of water, a hollow tower having open ends supported on said frame, scoops mounted on the frame adapted to scoop water into the lower end of the tower, and propellers operating in the tower adapted to force the water upwardly through the tower discharging the water in the form of mist at the upper end of said tower.

3. A device for elevating water, comprising a frame, a hollow tower having a flared open lower end mounted on the frame, deflectors mounted on the frame under said flared lower end of the tower adapted to deflect water into the flared end of the tower, and propellers operating within said flared lower end of the tower adapted to force water upwardly through the tower in the form of mist, discharging the mist to the atmosphere.

4. A device for elevating water, comprising a float supported frame, a hollow open-ended tower supported on the frame, scoops supported on said frame directly under the open lower end of the tower adapted to direct water into the lower end of the tower, propellers operating in the lower end of the tower adapted to force water through said tower, superposed inlet pipes mounted on said tower, propellers operating in said inlet pipes directing blasts of air into said tower converting the water into a fine mist as it passes upwardly through the tower, and said tower discharging mist to the atmosphere at the upper end of the tower.

5. A device for elevating water, comprising a frame, a vertical tower supported on the frame, said tower being hollow and open at its ends, scoops supported on said frame directly under said tower adapted to direct water into said tower as the frame moves through water, propellers operating in the lower end of said tower adapted to direct water through said tower, air inlet pipes disposed along the tower in communication therewith, and booster propellers mounted in said inlet pipes adapted to transform water entering said tower into mist delivered to the atmosphere at the upper end of the tower.

6. A device for elevating water, comprising a float supported frame adapted to be moved over the surface of a body of water, a hollow tower mounted on said frame, said tower having open ends, a series of water scoops mounted within the frame adapted to direct water into said tower as the frame moves over the body of water, propellers operating in said tower for directing water and air through said tower transforming the water into mist, fog air inlet pipes supported on said tower in communication with the tower, booster propellers operating in said fog air inlet pipes adapted to increase air velocity directed through said tower, and governor controlled adjustable shutters mounted within said fog air inlet pipes adapted to regulate the force of fog air into the tower through said inlet pipes.

7. A device for elevating water, comprising a float supported frame adapted to be moved over the surface of a body of water, a hollow tower mounted on said frame, said tower having open ends, a series of water scoops mounted within the frame adapted to direct water into said tower as the frame moves over the body of water, spiral deflectors formed on the wall of the tower over which the water entering the tower passes, propellers operating in said tower for directing water and fog air through said tower transforming the water into mist, fog air inlet pipes supported on said tower in communication with the tower, booster propellers operating in said fog air inlet pipes adapted to increase air velocity directed through said tower, and governor controlled adjustable shutters mounted within said fog air inlet pipes adapted to regulate the flow of fog air into the tower through said inlet pipes.

References Cited in the file of this patent

UNITED STATES PATENTS

| | | |
|---|---|---|
| 1,945,328 | Perkins | Jan. 30, 1934 |
| 1,993,635 | Towt | Mar. 5, 1935 |

FOREIGN PATENTS

| | | |
|---|---|---|
| 14,309/23 | Australia | May 27, 1924 |